(12) United States Patent
Barnett et al.

(10) Patent No.: US 10,192,263 B2
(45) Date of Patent: Jan. 29, 2019

(54) BRANCH RECOMMENDATION

(71) Applicant: The Toronto-Dominion Bank, Mississauga (CA)

(72) Inventors: Jonathan K. Barnett, Oakville (CA); Lauren Van Heerden, Bedford, NH (US); Orin Del Vecchio, Richmond Hill (CA); Gunalan Nadarajah, Milton (CA); John Barbon, London (CA); Paul Mon-Wah Chan, Markham (CA); Jakub Danielak, Toronto (CA); Christianne Moretti, Richmond Hill (CA); Matthew Hamilton, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 754 days.

(21) Appl. No.: 14/802,973

(22) Filed: Jul. 17, 2015

(65) Prior Publication Data

US 2016/0019640 A1    Jan. 21, 2016

Related U.S. Application Data

(60) Provisional application No. 62/026,550, filed on Jul. 18, 2014.

(51) Int. Cl.
  *G06Q 40/02* (2012.01)
(52) U.S. Cl.
  CPC .................................... *G06Q 40/02* (2013.01)

(58) Field of Classification Search
  CPC ... G06Q 20/108; G06Q 20/1085; G06Q 40/02
  USPC ................................ 235/379; 705/39, 42, 43
  See application file for complete search history.

(56) References Cited

U.S. PATENT DOCUMENTS

| | | | |
|---|---|---|---|
| 7,712,657 B1 * | 5/2010 | Block | G06Q 20/1085 235/379 |
| 8,091,778 B1 | 1/2012 | Block et al. | |
| 8,725,569 B2 | 5/2014 | Liang et al. | |
| 9,342,963 B1 * | 5/2016 | McGraw, IV | G07F 19/00 |

(Continued)

OTHER PUBLICATIONS

Parikh. (2005). "Using Mobile Phones for Secure, Distributed Document Processing in the Developing World," IEEE Computer Society, pp. 74-81.

(Continued)

*Primary Examiner* — Suezu Ellis
(74) *Attorney, Agent, or Firm* — Duane Morris LLP

(57) ABSTRACT

A method and system for recommending a physical location at which to complete an electronic activity are disclosed. In some examples, initiation of the electronic activity by a user at a first physical location is detected, that the electronic activity is to be completed at a physical location different from the first physical location is determined, one or more portions of the electronic activity that remain incomplete are determined, a second physical location at which to complete the one or more incomplete portions of the electronic activity is identified, and information about the electronic activity is provided to the second physical location. In some examples, the identification of the second physical location is based on at least characteristics of the electronic activity, the user, and/or the second physical location.

20 Claims, 9 Drawing Sheets

(56) References Cited

U.S. PATENT DOCUMENTS

| | | | | |
|---|---|---|---|---|
| 2007/0078766 | A1* | 4/2007 | Thomas | G06Q 40/02 705/43 |
| 2010/0017327 | A1* | 1/2010 | Treadwell | G06Q 20/04 705/35 |
| 2012/0143755 | A1* | 6/2012 | Burrell | G06Q 20/10 705/43 |
| 2012/0197797 | A1* | 8/2012 | Grigg | G06Q 20/1085 705/43 |
| 2013/0124410 | A1* | 5/2013 | Kay | G06Q 40/02 705/43 |
| 2014/0156512 | A1 | 6/2014 | Rahman et al. | |
| 2015/0120522 | A1* | 4/2015 | Moore | G06Q 40/02 705/35 |
| 2016/0019641 | A1* | 1/2016 | Barnett | G06Q 40/02 705/35 |
| 2016/0125526 | A1* | 5/2016 | Sivadasan | G06Q 40/02 705/39 |

OTHER PUBLICATIONS

Servus Credit Union. (2012). "Servus ATM and Branch Finder App," from Push Interactions, accessed Sep. 25, 2014 on <http://www.collegemobile.com/application/servus-atm-branch-finder-for-servus-credit-union/> 14 pages.

Wagner, et al. (2002). "A Roadmap to Advanced Personalization of Mobile Services," Proc. of the Int. Federated Conferences DOA/ODBASE/CoopIS (Industry Program). 5 pages.

Western Union. (2014). "Send Money in Person," accessed on <https://www.westernunion.com/us/en/send-money-in-person.html> 3 pages.

Zheng, et al. (2011). "Recommending Friends and Locations Based on Individual Location History," ACM Transactions on the Web, 5(1):5.1-5.44.

\* cited by examiner ively) to receive, a recommendation for a physical banking location according to examples of the disclosure.

BRANCH RECOMMENDATION

CROSS-REFERENCE TO RELATED APPLICATION

This application claims priority to U.S. Provisional Patent Application No. 62/026,550, entitled "BRANCH RECOMMENDATION," filed Jul. 18, 2014, which is hereby incorporated by reference in its entirety.

FIELD OF THE DISCLOSURE

This relates generally to a computing system that can provide a recommendation of a physical location, such as a banking branch, at which a user can complete an activity, such as a mortgage application.

BACKGROUND OF THE DISCLOSURE

User interaction with computers and computing systems continues to expand as computers become more tightly integrated with daily life. A user can interact with a computing system in many contexts. For example, a user can interact with a banking website and associated server to complete various banking tasks, such as transferring funds between bank accounts or initiating a mortgage application process. In interactions between a user and a computing system, there may be a moment when the user wishes to, or is required to, visit a physical location that is associated with the interactions and/or the computing system. For example, after initiating a mortgage application process online using a banking website, a user may wish to complete the application process in-person at a physical banking branch.

SUMMARY OF THE DISCLOSURE

The examples of the disclosure provide various ways in which a computing system can determine and provide a recommendation of a physical location to a user, the physical location relating to interactions between the user and the computing system. The recommendation can be based on information such as characteristics of the user, characteristics of the interactions between the user and the computing system, and characteristics of various physical locations. For example, information such as common travel patterns of the user (e.g., the user's route to work, where the user stops for coffee and/or groceries, when the user performs the above activities, and the frequency with which the user comes into close proximity to various landmarks, such as branch, store, and/or ATM locations) and physical location resources (e.g., accessibility, staffing, etc.) can be used by the computing system to recommend a physical location to the user. In some examples, the recommended physical location can be a location at which the user can complete an activity that the user initiated during the user's interactions with the computing system (e.g., complete, at a physical location, a mortgage application that the user initiated online).

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

A user can interact with a computing system in many contexts. For example, a user can interact with a banking website and associated server to complete various banking tasks, such as a complex transfer of funds between bank accounts or initiating a mortgage application process. In such interactions between a user and a computing system, there may be a moment when the user wishes to, or is required to, visit a physical location associated with the interactions and/or computing system. For example, after initiating a mortgage application process online using a banking website, a user may wish to complete the process in-person at a physical banking branch. In some examples, the user may be required to complete the application process in-person at a physical banking branch because online completion of certain aspects of the mortgage application may not be permitted. As another example, a user may request foreign currency online for upcoming travel, and may be required to collect the foreign currency at a physical banking location (e.g., an automated teller machine (ATM), a banking branch, etc.). In those circumstances where a user has requested or is required to visit a physical location associated with the interactions between the user and the computing system, the computing system may provide a recommended physical location for the user to visit. The examples of the disclosure provide various ways in which a computing system can determine and provide a recommendation of such a physical location to a user.

It is noted that while the examples of the disclosure may be presented in the context of interactions between a user and a banking computing system, the scope of the disclosure is not so limited, and extends to any context in which a user may be interacting with a computing system that can provide a recommendation to the user of a physical location relating to those interactions. For example, in a context other than banking, a user may make a medical appointment on a doctor's website, and may request or be required to have an x-ray performed for the medical appointment at a physical medical location.

Figure 1A:
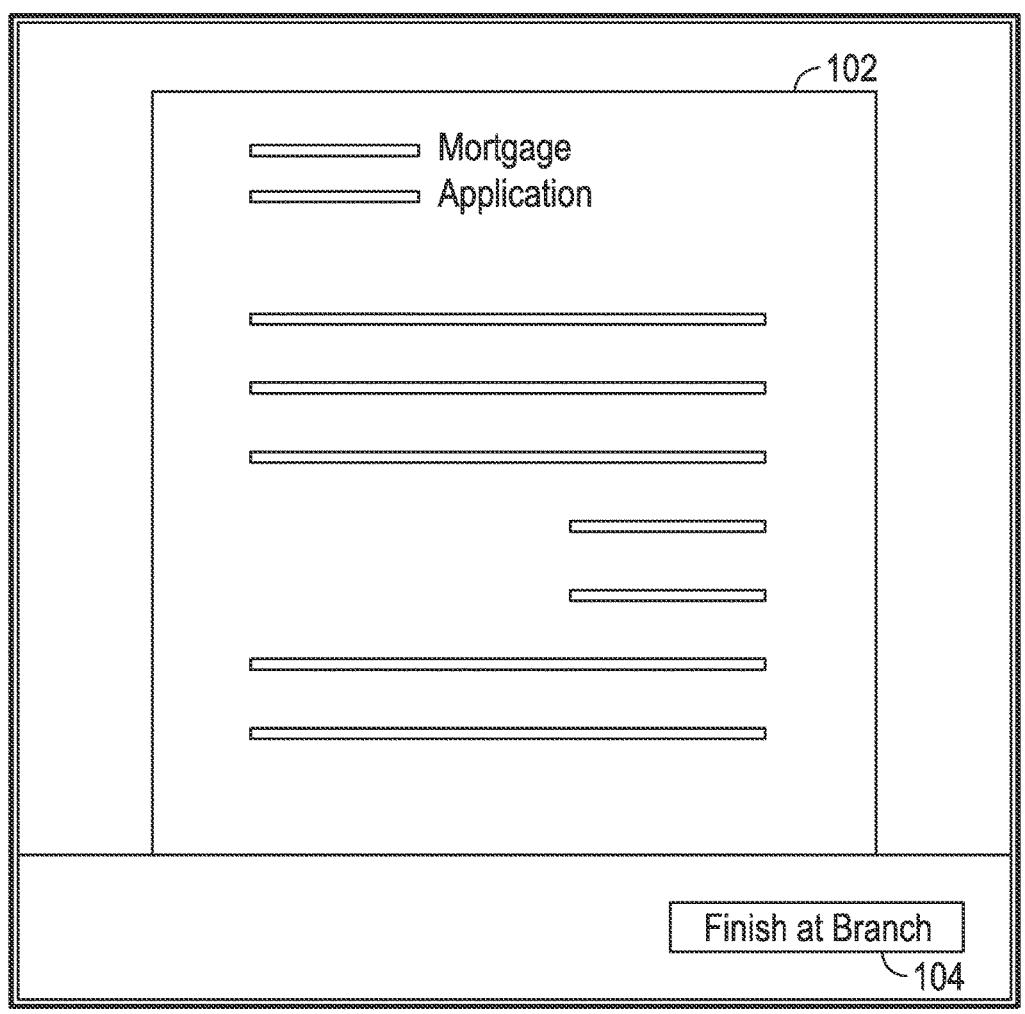
FIGS. 1A-1C illustrate exemplary situations in which a user can request, or be required to receive, a recommendation for a physical banking location according to examples of the disclosure.
Figure 1B:
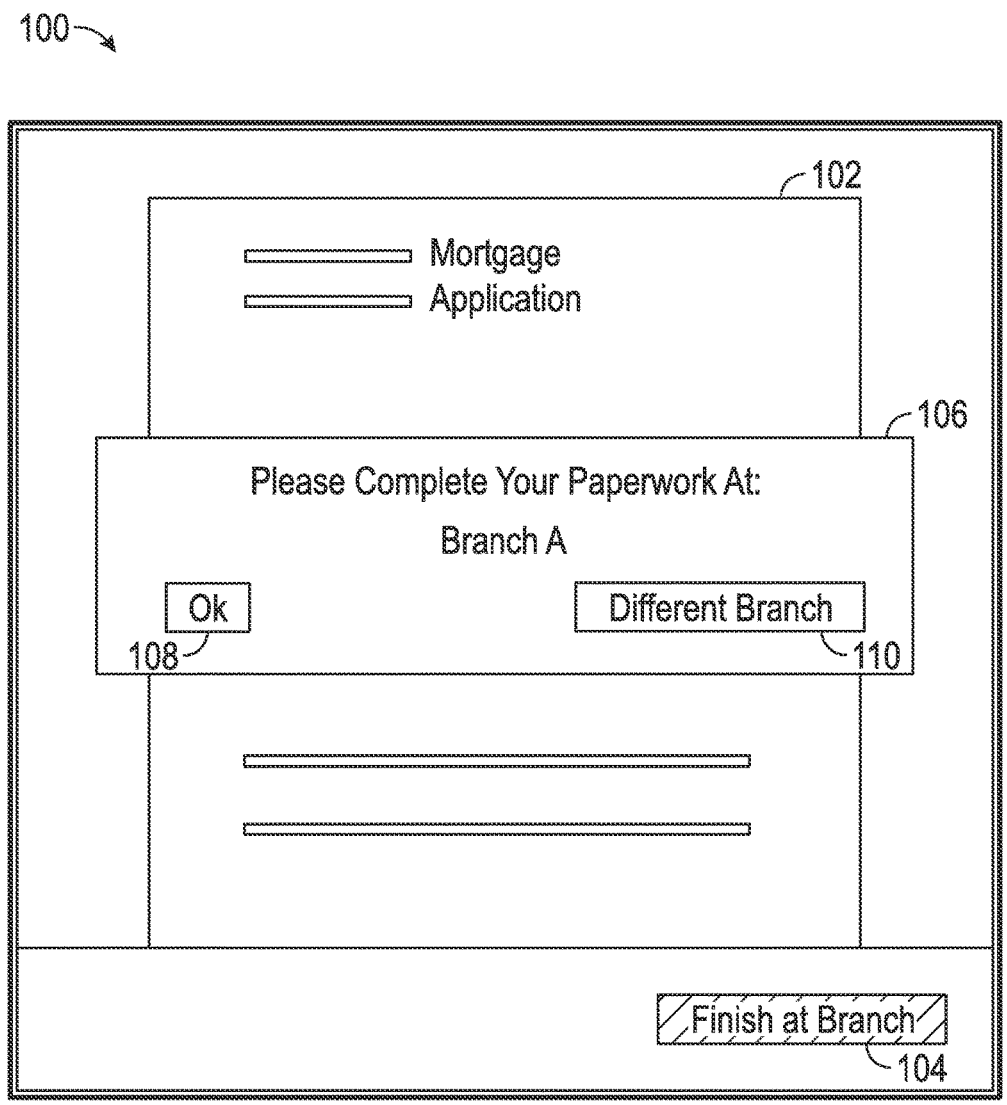
Figure 1C:
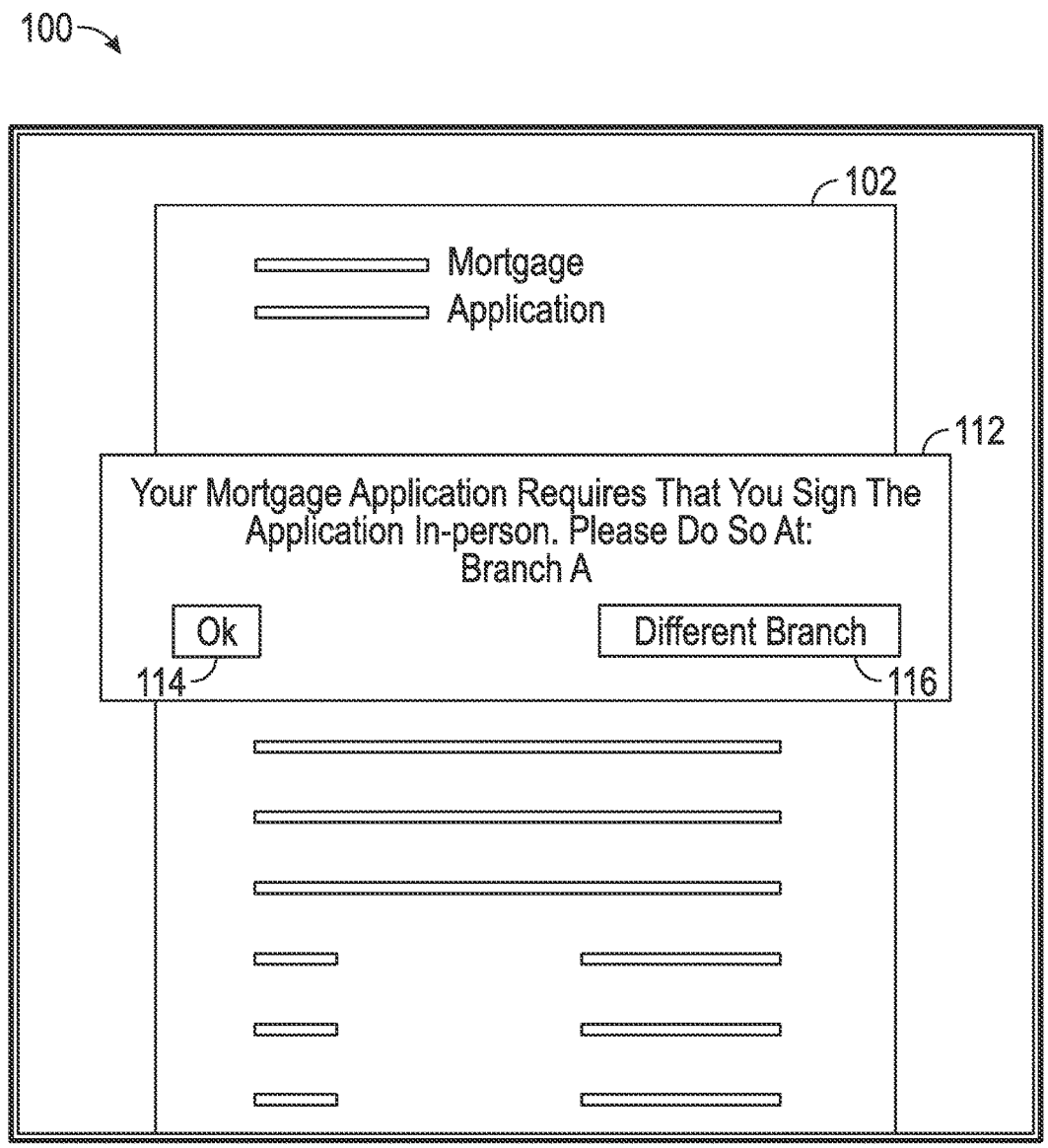

FIGS. 1A-1C illustrate exemplary situations in which a user can request, or be required to receive, a recommendation for a physical banking location according to examples of the disclosure. FIG. 1A shows an exemplary user interface 100 associated with an exemplary mortgage application process initiated on a banking website. User interface 100 can include mortgage application 102, which can be displayed in response to a user's request to initiate the mortgage application on a banking website, for example. Mortgage application 102 can include one or more entry fields (e.g., text entry fields) into which the user can input information relating to the mortgage application, such as address information, financial information, etc.

During the process of completing mortgage application 102, rather than complete the mortgage application online, the user may wish to complete the mortgage application at a physical banking location. The user may wish to do so for any number of reasons, including not having sufficient time to complete the mortgage application at the present time, or desiring help from employees at a physical banking location. To facilitate completion of mortgage application 102 at a physical location, user interface 100 can include an input element, such as button 104, which can allow the user to request that the mortgage application be completed at a physical banking location (e.g., a branch).

FIG. 1B shows an exemplary user interface 100 that can be displayed in response to receiving a request to complete the mortgage application at a physical location. In response to a selection of button 104 by the user, dialog box 106 can be displayed. Dialog box 106 can provide a location at which the user can complete mortgage application 102—in the illustrated example, the user can complete the mortgage application at Branch A. In some examples, dialog box 106 can include further information about Branch A, such as address or contact information. The provided physical location can be a location recommended by the computing system at which the user can complete mortgage application 102. In some examples, the physical location recommended by the computing system for completing mortgage application 102 can be a location formally associated with the bank with which the user is applying for the mortgage, such as a banking branch, as illustrated in FIG. 1B. However, in some examples, the physical location recommended by the computing system can be any physical location, whether or not formally associated with the bank, such as a coffee shop, a restaurant, an address, or any other physical location at which the computing system determines mortgage application 102 can be completed. For example, the computing system can arrange for a bank employee to meet the user at a given coffee shop at a particular date and time to complete mortgage application 102. The details of how the computing system can determine the above recommended locations will be described in more detail below.

In some examples, dialog box 106 can also allow for the user to either confirm the recommended physical location or request a different physical location. For example, dialog box 106 can include button 108, selection of which by the user can confirm that the user wishes to complete mortgage application 102 at the recommended physical location (Branch A). Dialog box 106 can also include button 110, selection of which by the user can indicate the user's desire to complete mortgage application 102 at a location different from the currently recommended physical location. Selection of button 110 by the user can cause the computing system to determine and present a different recommended physical location at which the user can complete mortgage application 102. In some examples, selection of button 110 can cause the computing system to present a list of alternative recommended physical locations at which the user can complete mortgage application 102, and the user can select their desired physical location from the list. In some examples, selection of button 110 can allow the user to disregard the computing system's originally recommended physical location, and provide their own location at which they wish to complete mortgage application 102. For example, the user may know that they will be traveling for a period of time, and may wish to complete mortgage application 102 at a physical location close to their travel destination(s). In such circumstances: 1) the user can provide, to the computing system, their own physical location at which they wish to complete mortgage application 102 (e.g., the user can specify a banking branch, a restaurant, etc. near their travel destination), 2) the user can provide their travel destination to the computing system, which can recommend a physical location based on the user's travel destination (e.g., the computing system can recommend a banking branch near, or within a predetermined distance of, the user's travel destination), or 3) the user can select their desired physical location from a list of recommended physical locations determined by the computing system based on the user's travel destination (e.g., the computing system can recommend a number of banking branches or other physical locations near, or within a predetermined distance of, the user's travel destination from which the user can choose). In the above circumstances, the computing system can determine the recommended physical locations in a manner similar to the computing system's recommendation of Branch A, above, the details of which will be described in more detail below.

FIG. 1C shows an exemplary user interface 100 that can be displayed in response to a determination by the computing system that the mortgage application requires completion at a physical location. As previously stated, in some circumstances, an activity that a user starts online (e.g., an "electronic activity") may need to be completed at a physical location, because, for example, one or more steps in the activity may not be permitted to be completed online. For example, a user may be able to complete most aspects of mortgage application 102 online via user interface 100, but a bank may require that the user sign the mortgage application or related documents in-person. In such circumstances, user interface 100 can display dialog box 112, which can indicate that one or more remaining aspects of mortgage application 102 need to be completed at a physical location, such as a banking branch. Dialog box 112 can also indicate a recommended physical location at which to complete mortgage application 102, as described above. Also as above, dialog box can include buttons 114 and 116 for confirming the recommended physical location or requesting a different physical location, respectively.

The ways in which the computing system of the disclosure can determine recommended physical locations will now be described. In some examples, the computing system can determine one or more recommended physical locations based on one or more of the user's current location, the user's past locations, the user's current behavior, the user's past behavior, the locations of the physical locations themselves and the characteristics of the physical locations. Some examples will be described with reference to FIGS. 2A-2B.

Figure 2A:
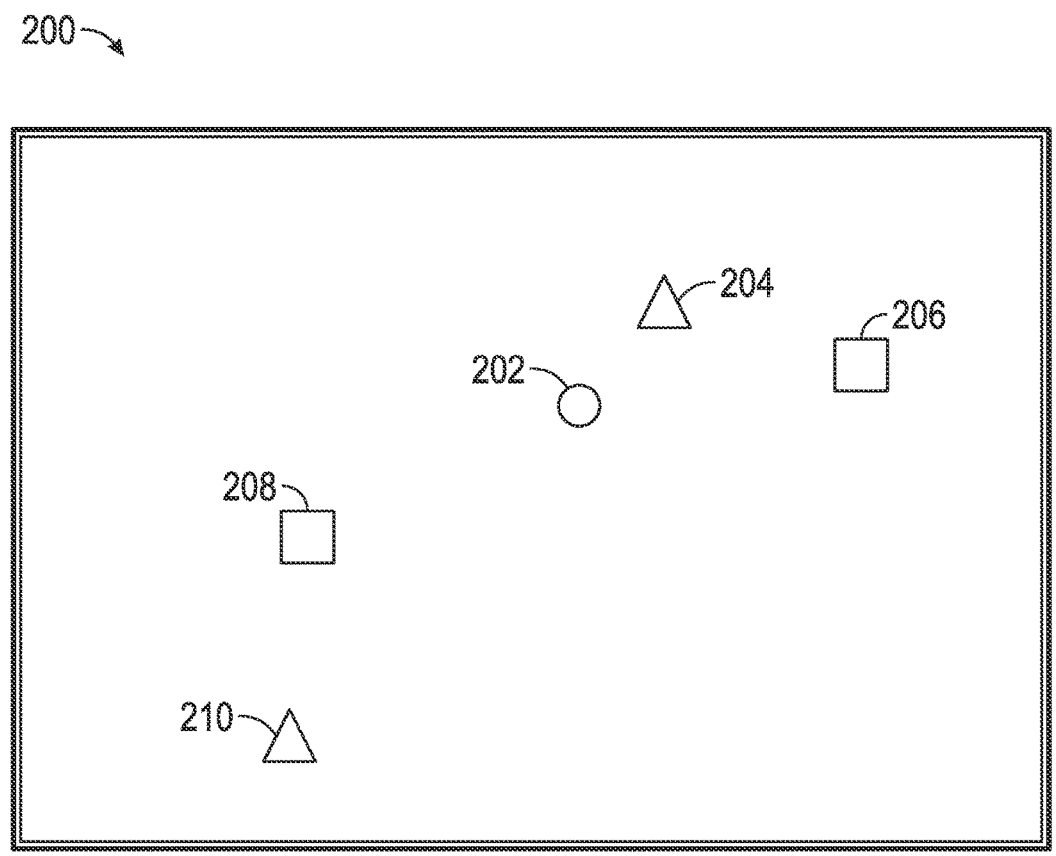
FIG. 2A illustrates an exemplary map of a user's location in relation to various physical locations at which the user may be able to perform various activities.

FIG. 2A illustrates an exemplary map 200 of a user's location in relation to various physical locations at which the user may be able to perform various activities, such as completion of mortgage application 102. The user can be located at 202. In some examples, location 202 can represent the location of the user's home where the user can initiate an electronic activity (e.g., starting mortgage application 102), though it is understood that the user need not be at his or her home to initiate an electronic activity. For example, a user can initiate an electronic activity on a portable computer while traveling, or can initiate an electronic activity over the phone while at work. Additionally, though the activity initiated by the user can be an online activity (i.e., initiated via the internet), it need not be to be within the scope of this disclosure—the scope of this disclosure can extend to any situation in which a user can initiate an activity via one channel, and complete the activity via a second channel (e.g., initiate an activity at a first ATM, and complete the activity at a second ATM; initiate an activity via phone, and complete the activity at a banking branch; etc.). The examples described herein can be analogously implemented in the context of the above activity transfers from one channel to another.

Referring again to FIG. 2A, physical location 204 can be closest to user's location 202, while physical locations 206, 208 and 210 can be located progressively further away from the user's location. In some examples, physical locations 204 and 210 can represent the locations of a bank's automated teller machines (ATMs), and physical locations 206 and 208 can represent the locations of branches of the bank. As described above, in some examples, the user may request or be required to complete an electronic activity initiated at location 202 at a different location, such as one or more of physical locations 204, 206, 208 and 210. In such circumstances, the computing system of the disclosure can determine a recommended physical location at which the user can complete the electronic activity. For example, the computing system can recommend physical location 206, which can represent the location of a banking branch, because it can be the closest branch to the user's location 202. The computing system may not recommend physical location 204 to the user, because physical location 204, which may represent the location of an ATM, may not have the resources needed to complete the user's electronic activity (e.g., a notary to notarize the signature pages of the user's mortgage application 102).

In some examples, the computing system may base the determination of the recommended physical location on more than simply the user's current location. For example, the computing system may determine the recommended physical location based alternatively or additionally on considerations of the user's past locations, the user's current behavior, the user's past behaviors and characteristics of the physical locations, among other things. For example, the computing system can consider the user's travel patterns in making a physical location recommendation to the user.

Figure 2B:
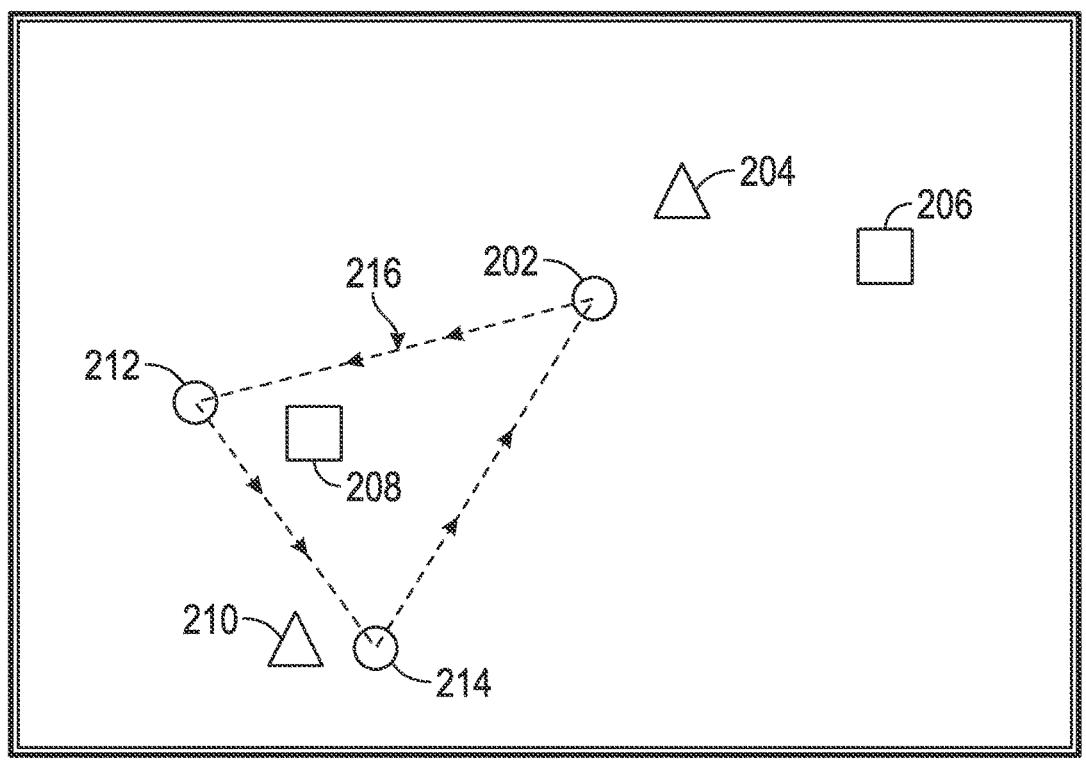
FIG. 2B illustrates an exemplary map of a user's location, various physical locations and a route commonly-traveled by the user.

FIG. 2B illustrates an exemplary map 201 of a user's location, various physical locations and a route commonly-traveled by the user. Map 201 can be substantially similar to map 200 of FIG. 2A, except that map 201 can also include route 216 from location 202 to location 212 to location 214 and back to location 202. Route 216 can represent a route that the user commonly travels. For example, route 216 can represent a route from the user's home (represented by location 202) to the user's workplace (represented by location 212) that the user travels Monday through Friday on most weeks. Additionally, most days after work, the user may travel from the user's workplace (represented by location 212) to the grocery store (represented by location 214) before returning to the user's home (represented by location 202).

Because the computing system, in some examples, can have access to information relating to the user—information such as route 216—the computing system can make its physical location recommendation decision based on such information. For example, instead of recommending physical location 206 to the user as discussed above with reference to FIG. 2A, the computing system can recommend physical location 208 to the user because physical location 208 can be on the way to the user's workplace (represented by location 212). Stopping at physical location 208 on the way to work can, in some circumstances, be more convenient for the user than driving to physical location 206. The computing system can recommend physical location 208 despite the fact that physical location 206 may be the user's home branch, or despite the fact that the user's home branch might be in another state, because the computing system can tailor its recommendations based on the user's recent activities. It is understood that the user's travel information discussed with respect to FIG. 2B is exemplary only, and that other aspects of the user's behavior can additionally or alternatively inform the computing system's physical location recommendation. For example, the user may take their children to soccer practice every Saturday, which can be held close to a banking branch. In such circumstances, the computing system can recommend that the user visit the banking branch near the soccer practice on a Saturday to complete the user's electronic activity.

In addition to providing a recommendation as to the location that a user can visit to complete the user's activity, the computing system can also provide the user with information as to what task(s) the user should perform at the recommended physical location in order to complete the user's activity. For example, the computing system can determine which portions of the user's activity remain incomplete, and can provide the user with tasks the user should perform to complete the incomplete portions of the user's activity (e.g., signing documents relating to a mortgage application, as illustrated in FIG. 1C, presenting identification documents to a bank teller, etc.).

It is understood that the physical location recommendations described above are illustrative only, and do not limit the manner in which the computing system can provide recommendations, nor the resulting recommendations that the computing system of the disclosure can provide. For example, in the example illustrated in FIG. 2B, the computing system may, in some circumstances, recommend physical location 206 rather than physical location 208 to the user as a result of considerations other than or in addition to the user's commonly-traveled route 216 (e.g., considerations of waiting times at physical locations 206 and 208).

As stated above, the computing system can base its physical location recommendation on various information relating to a user. In some examples, the information relating to a user can be collected and associated, by the computing system, with a profile of the user. Each piece of information can be weighted independently (i.e., have varying degrees of importance) in arriving at the computing system's recommendation. In some examples, as described above, the computing system's recommendation can be based on common travel patterns of the user; for example, the user's route to work, where the user stops for coffee and/or groceries, when the user performs the above activities, etc. Additionally, in some examples, the computing system's recommendation can be based on the frequency with which the user comes into close proximity (e.g., within a predetermined distance) to various landmarks, such as branch, store, and/or ATM locations. As previously mentioned, the computing system can weight these and other considerations independently in arriving at a recommendation; for example, a physical location's proximity to the user's route to work, the user's duration in proximity to the physical location, and wait times at the physical location can be given successively lower weights by the computing system in arriving at a recommendation. Referring back to FIG. 2B as an example, the computing system may recommend physical location 210 to a user instead of physical location 208, because while physical location 208 may be closer to the user's route to work, the user may only quickly pass by physical location 208 when driving to work. In contrast, the user may be in proximity to physical location 210 for a longer period of time while at the grocery store at location 214, and thus the computing system may recommend that the user visit physical location 210 instead of physical location 208 to complete the user's activity.

Location information relating to the user can be collected using any suitable location information gathering technique; for example, gathering GPS information (e.g., GPS information from the user's cellular telephone), geofencing information (e.g., geofences established around branches and/or ATMs that are triggered when the user's phone, for example, enters a respective geofence), shopping information (e.g., information about where the user shops based on financial activity data), traffic camera information, cellular telephone tower triangulation, banking activity (e.g., information about which ATMs, branches, etc., the user visits, and the types of activities the user performs at those locations), gym membership and activity information, calendar information (e.g., time, place and/or subject matter of the user's meetings extracted from a calendar on the user's cellular telephone), etc. Using such information, the computing system can recommend a physical location in proximity to a grocery store at which the user completes their weekly grocery shopping, or a physical location in proximity to a gym at which the user exercises daily, for example.

The computing system can additionally or alternatively base its physical location recommendation on where the user suspended the user's current electronic activity (e.g., where the user was when the user requested to complete mortgage application 102 at a physical location), the user's direction of travel when the user suspended the electronic activity (e.g., if the user was driving while initiating an electronic activity over the phone, the computing system can consider the user's direction of travel when recommending a physical location so as to not recommend a physical location from which the user is moving away), and what task(s) are to be completed at the physical location (e.g., tasks to complete the incomplete portions of the electronic activity, such as signing of documents relating to mortgage application 102). For example, physical locations that do not have the facilities or resources necessary to perform the tasks needed to complete the user's electronic activity (e.g., a notary) can be eliminated from the computing system's set of potential physical location recommendations. The computing system's recommendation can also be based on the time of day that the user would be most likely to visit a particular physical location, which can be based on the user's travel patterns, and whether that particular physical location would have the facilities or resources necessary to perform the required tasks at that time (i.e., perform the required tasks to complete the incomplete portions of the electronic activity). Some other characteristics of physical locations that can affect the computing system's physical location recommendation can be the availability of certain personnel at the physical location, the availability of certain technology at the physical location, and the degree to which the physical location is accessible (e.g., wheelchair access if the user uses a wheelchair). In some examples, wait times for completing the required tasks at the physical locations can affect the computing system's physical location recommendation (e.g., physical locations with longer wait times can be less likely to be recommended than physical locations with shorter wait times, or physical locations with wait times shorter than a threshold amount of time may be recommended while physical locations with wait times longer than the threshold amount of time may not be recommended).

In some examples, the computing system's physical location recommendation can be at least partially based on machine learning of the user's activities and behaviors, including the user's past behaviors when completing activities at a physical location. For example, a machine learning algorithm can learn the physical locations at which the user most often completes activities, and can give those locations more weight in the recommendation determination (i.e., be more likely to recommend those locations as compared with other locations). This machine learning can be any suitable machine learning implementation, such as a rule-based machine learning algorithm and/or a neural network-based machine learning algorithm.

In some examples, the computing system can provide the user with more than one recommended physical location at which the user can complete the user's activity. The recommended locations can, in some examples, be ordered from most recommended by the computing system to least recommended by the computing system. These degrees of recommendation can be based on one or more of the features described in the disclosure. The user can choose one or more of these locations at which to complete the activity, or can request additional recommendations if the user does not wish to complete the activity at any of provided locations. Though the examples of the disclosure are generally described in the context of a single physical location recommendation provided by the computing system, it is understood that the scope of the disclosure also extends to multiple physical locations recommended by the computing system.

Figure 3:
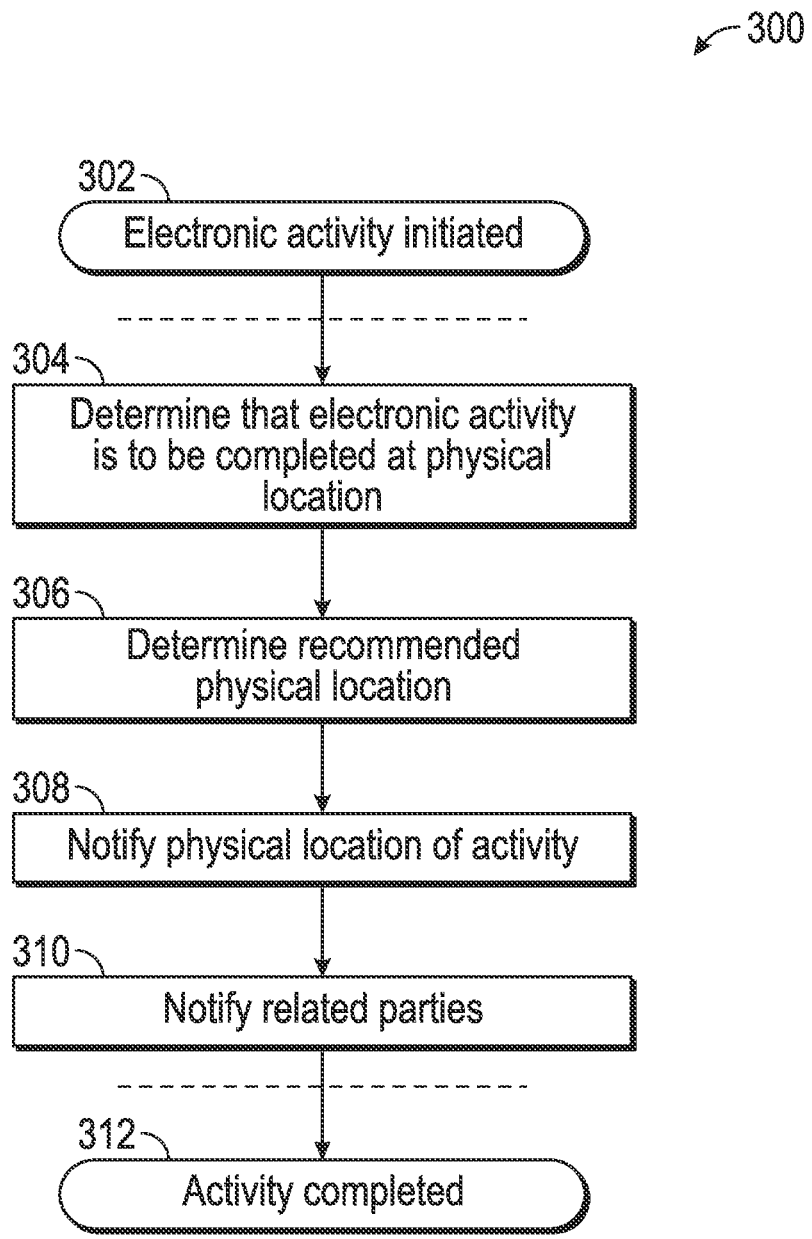
FIG. 3 shows an exemplary process illustrating how the computing system can facilitate the completion of a user's activity according to examples of the disclosure.

FIG. 3 shows an exemplary process 300 illustrating how the computing system can facilitate the completion of a user's activity according to examples of the disclosure. Process 300 can incorporate one or more of the features of the examples disclosed above, some of which will not be repeated here for brevity. A user can initiate an electronic activity at 302. For example, a user can initiate a mortgage application through the website of a bank. Initiation of electronic activity 302 is illustrated only to provide context for the process that follows, and does not imply that the initiation is performed by the computing system of the disclosure.

The computing system can determine that the electronic activity is to be completed at a physical location at 304. For example, the computing system might receive a request by the user to complete the electronic activity at a physical location, or the computing system might determine that the electronic activity requires completion at a physical location. In some examples, the computing system can determine that the electronic activity requires completion at a physical location based on characteristics of the user, characteristics of the electronic activity and/or other considerations such as business or regulatory (legal) considerations. For example, the electronic activity, by its nature, may require multiple parties for completion. In such circumstances, the computing system can determine that the electronic activity should be completed at a physical location when the user has completed its portion(s) of the electronic activity, so that the other parties can complete their respective portions of the electronic activity at the physical location. In some examples, one or more of the other parties can be formally associated with the bank (e.g., employees, resources, etc.). In some examples, one or more of the other parties may not be formally associated with the bank—for example, the user's father as a cosigner on a mortgage application, or a notary contacted by the bank or the user for notarizing the mortgage application.

In some examples, the electronic activity can be regulated by a set of regulations, about which the computing system can have information. Based on those regulations, the computing system may require the user to complete certain portions of the electronic activity at a physical location—for example, those portions of the electronic activity that the regulations prohibit from being completed online. As an example, banking regulations may require that certain portions of a mortgage application (e.g., signature portions) be completed in-person so that they can be witnessed by another party. Once the user has completed the portions of the mortgage application that need not be witnessed, the computing system can determine that the mortgage application should be completed at a physical location, such as a banking branch, so that the user can complete those portions that must be witnessed in-person.

In some examples, the computing system may determine that the electronic activity should be completed at a physical location for business reasons, such as for offering the user additional products or services that may be of interest to the user or relevant to the electronic activity. For example, if the electronic activity is a mortgage application, the computing system may determine that the user could be interested in mortgage-related products or services, such as home insurance products, home buying services or creditor insurance, and can determine that the mortgage application should be completed at a physical location (e.g., a banking branch) so that the additional products or services can be discussed with, and potentially sold to, the user by an employee. In some examples, characteristics of the user (e.g., the user's past interactions with the bank, the user's propensity to buy services based on the user's past shopping data or online activity, etc.) can be considered by the computing system in determining whether the user would be likely to purchase the additional products or services—if the computing system determines that the user would be likely to purchase such additional products or services, the computing system can determine that the electronic activity should be completed at a physical location, and if not, the computing system can determine that the electronic activity need not be completed at a physical location.

Other characteristics of the user can additionally or alternatively be considered by the computing system in determining whether the electronic activity should be completed at a physical location. For example, data captured about the user's actions during, or leading up to, the electronic activity, which can indicate that the user is confused by, or uncertain about, certain aspects of the electronic activity, can be utilized by the computing system to determine that the electronic activity should be completed at a physical location—in such circumstances, an employee or other resource at a physical location can assist the user in completing the activity. As another example, some users may be able to complete the electronic activity (or portions of the electronic activity) without going to a physical location, while other users may not be able to do so, due, for example, to differences in user characteristics such as user authorizations or permissions. For example, some users may be authorized by the computing system to authenticate their identities online, and thus may not be required to go to a physical location to complete the electronic activity—which may require such authentication—while other users may not have such authorization. In the former circumstance, the computing system can determine that the electronic activity need not be completed at a physical location, whereas in the latter circumstance, the computing system can determine that the electronic activity is required to be completed at a physical location. In some examples, the computing system can determine that different users should complete different portions of an electronic activity at a physical location—for example, some users, because of their authorizations or permissions, may be required to complete portions of an electronic activity at a physical location that are different from portions of the electronic activity that other users, who can have different authorizations or permissions, may be required to complete at a physical location.

In some examples, the computing system can additionally determine which portions of the electronic activity remain incomplete, and thus may need to be completed at a physical location. For example, if the user has partially completed a mortgage application, the computing system can determine which portions of the mortgage application remain incomplete, and those portions can be determined to be the portions to be completed at the physical location.

The computing system can determine a recommended physical location at 306 and optionally present the recommended physical location to the user. The determination of the recommended physical location can be performed as described previously, and can be at least partially based on the incomplete portions of the electronic activity. The computing system can also provide the user with information about the physical location and/or information about what tasks the user should complete at the physical location at step 306. Determining the recommended physical location at 306 can include determining a resource and/or employee that is available and capable to support completion of the electronic activity at a physical location, and determining the recommended physical location depending on where that resource and/or employee is located. The physical location recommended by the computing system can be any physical location, whether or not formally associated with, for example, the bank, such as a coffee shop, a restaurant, an address, or any other physical location at which the computing system determines the electronic activity can be completed. For example, the computing system can arrange for a bank employee to meet the user at a given coffee shop at a particular date and time to complete the electronic activity. When multiple parties are required to complete the electronic activity, determining the recommended physical location for completing the electronic activity can consider the characteristics of one or more of the multiple parties, in the manners described in this disclosure, and in some examples, different parties can complete their portions of the physical activity at different physical locations (i.e., the computing system can recommend different physical locations to the different parties).

The computing system can notify the physical location and/or one or more parties about the activity and the user at 308. For example, the computing system can transfer information to the physical location, an employee and/or a resource describing why the user is coming to the physical location, so that the physical location, employee and/or resource can be prepared for the user. In some examples, the computing system can transfer information about the user's electronic activity, including information about what portions of the activity the user has already completed, to the physical location so that the physical location can prepare whatever may be necessary for the user to complete the activity at the physical location (e.g., prepare the required documents, resources, etc.). As another example, the computing system can schedule an appointment with the required resources (e.g., technology, employees, etc.) at the physical location based on the user's activity and the user's most likely arrival time at the physical location.

The computing system can notify related parties about the user, the user's activity and/or the physical location at 310. For example, the computing system can notify a particular office to send appropriate documents to the proper resources at the recommended physical location so that the user can complete the activity. In some examples, the computing system can notify the user's home branch (or any other branch at which the user has conducted business) of the user's activity and the physical location so that appropriate actions can be taken at the home branch. For example, the user's home branch can record the user's activities so that the user's records at the home branch can remain current, and/or can transfer information to the recommended location that may be relevant to the user's activity. As another example, the computing system can notify other parties who may be needed to complete the electronic activity of the electronic activity (e.g., the user's cosigner, a notary, an employee or resource of the bank, etc.). This notification can include information such as information about the electronic activity and information about the physical location (e.g., a banking branch, a coffee shop, etc.) to which the party should go to complete the physical activity, as described above.

Eventually, the user can complete the activity at the recommended physical location at 312. Completion of the activity 312 is illustrated only to provide context for the process that precedes, and does not imply that the completion is performed by the computing system of the disclosure.

Figure 4:
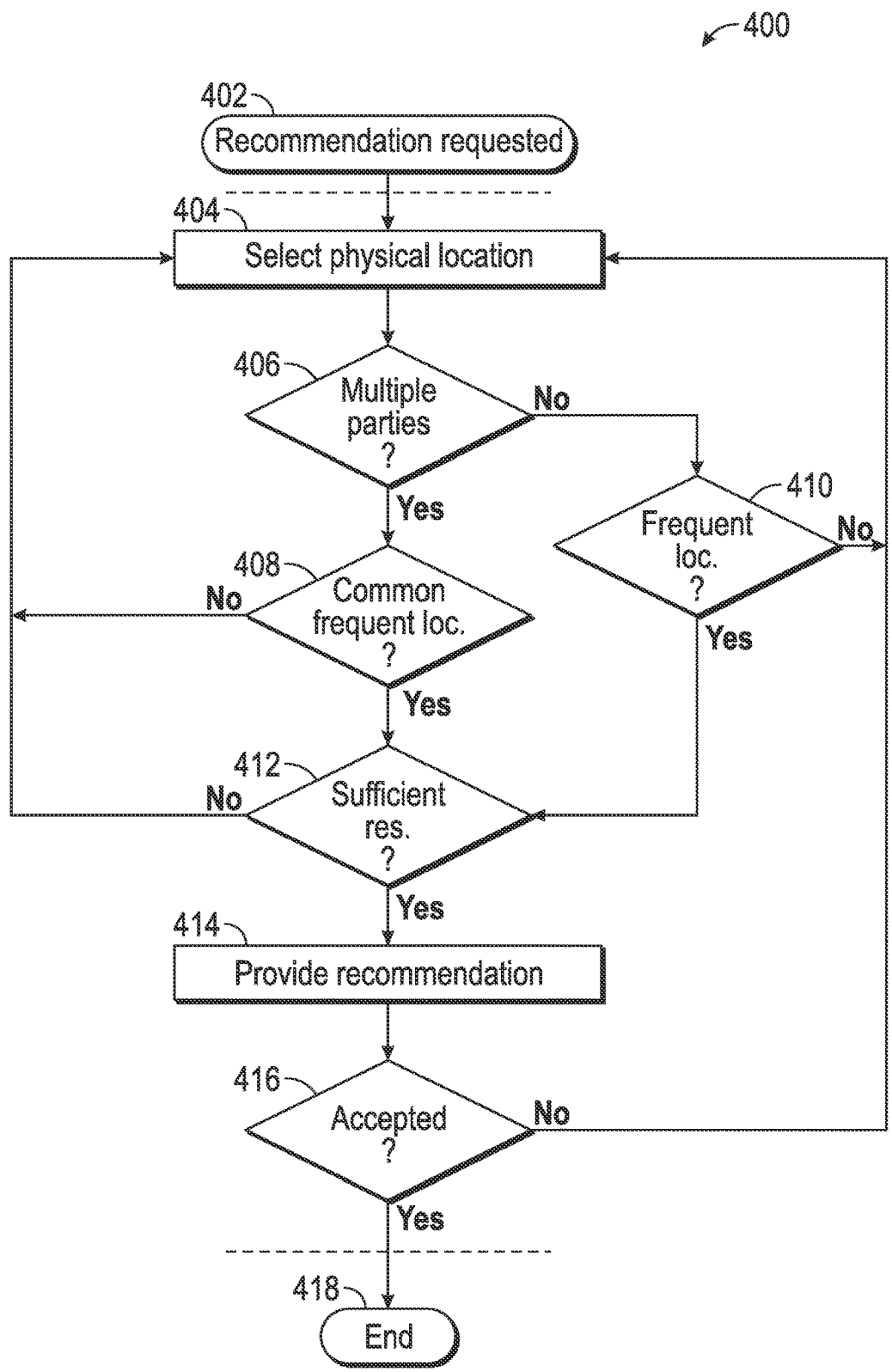
FIG. 4 illustrates an exemplary process for determining a recommended physical location at which an activity is to be completed according to examples of the disclosure.

FIG. 4 illustrates an exemplary process 400 for determining a recommended physical location at which an activity is to be completed according to examples of the disclosure. Process 400 can incorporate one or more of the features of the examples disclosed above, some of which will not be repeated here for brevity. In some examples, process 400 can be performed as part of step 306 in FIG. 3. A recommendation for a physical location can be requested at 402. This request can correspond to a user requesting a physical location, or the computing system determining that a physical location recommendation is needed (e.g., similar to step 304 in FIG. 3). The request for the recommendation 402 is illustrated only to provide context for the process that follows, and does not imply that the recommendation is requested by the computing system of the disclosure.

The computing system can select a physical location at 404. The selected location can be identified in accordance with the examples disclosed above. For example, the selected location can be one of a plurality of locations that can be in general proximity to the user's current location.

Whether multiple parties are required to complete the activity at issue can be determined at 406. For example, if a user is completing a mortgage application for which the user's parent is to be a cosigner, both the user and the user's parent may be required to sign the mortgage application at a physical location. In such a circumstance, the computing system can recommend a physical location (or more than one physical location—e.g., one for the user and a different one for the user's parent) at which the parties can complete the activity. In some examples, the computing system can additionally or alternatively coordinate the actions that each party may need to perform at their respective locations. For example, the computing system can inform: 1) the user that the user should visit location A to sign form A, and 2) the user's parent that they should visit location B to sign form B, and that they should bring their most recent banking statements with them. In some examples, the computing system can recommend the same location, but different times, to each of the multiple parties (e.g., the computing system can recommend that the first party visit location A at 1:00 pm, and that the second party visit location A at 3:00 pm). The computing system can make shared and/or individualized recommendations to each of the multiple parties in any of the various ways described in this disclosure. In some examples, one or more of the multiple parties required to complete the physical activity can be formally associated with the bank, though they need not be, as described above.

If multiple parties are required to complete the activity at issue, in some examples, the computing system can determine whether the selected location is a location that each of the multiple parties frequently passes by at 408. If the selected location is not a location that each of the multiple parties frequently passes by, another physical location can be selected at 404 based on one or more of the considerations discussed above.

If multiple parties are not required to complete the activity at issue, the computing system can determine whether the selected location is a location that the user frequently passes by at 410. If the selected location is not a location that the user frequently passes by, another physical location can be selected at 404 based on one or more of the considerations discussed above.

If the selected location is a location that the user or the multiple parties frequently pass by, whether the selected location has sufficient resources to complete the user's activity can be determined at 412. For example, whether the selected location has the necessary employees (e.g., a notary) or necessary accessibility (e.g., wheelchair accessibility) can be determined. If the selected location does not have sufficient resources to complete the user's activity, another physical location can be selected at 404 based on one or more of the considerations discussed above.

If the selected location does have sufficient resources to complete the user's activity, the computing system can provide the selected location as a recommended physical location to the user at 414. This can include providing address information for the physical location, and any tasks that the user may need to complete at the physical location.

Whether the user has accepted the selected location can be determined at 416. If the user has not accepted the selected location, another physical location can be selected at 404 based on one or more of the considerations discussed above.

If the user has accepted the selected location, process 400 of determining a recommended physical location can end at 418 with the currently selected physical location being the recommended location.

Figure 5:
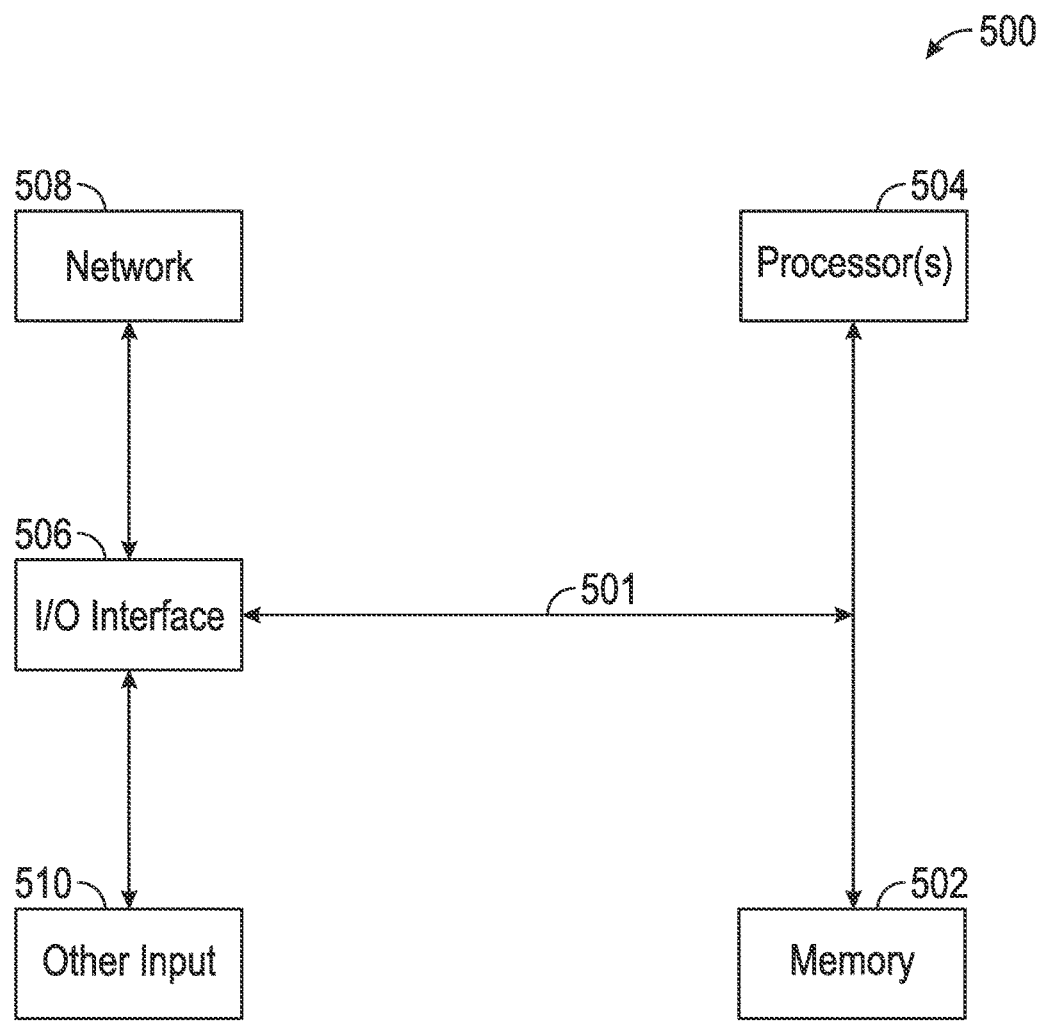
FIG. 5 is a block diagram of the exemplary computing system of the disclosure implementing the physical location recommendation of the disclosure.

FIG. 5 is a block diagram 500 of the exemplary computing system of the disclosure implementing the physical location recommendation of the disclosure. The system can be composed of a single computer or a collection of computers. The system can include memory 502, one or more processors 504 and I/O interface 506. Memory 502, one or more processors 504 and/or I/O interface 506 can be separate components or can be integrated circuits. The various components in the system can be coupled by one or more communication buses or signal lines 501.

I/O interface 506 can be coupled to a network 508. I/O interface 506, through network 508, can send and/or receive data from and/or to the system. Other input 510 can also be coupled to I/O interface 506, and can allow for sending and/or receiving of data from and/or to the system other than via network 508.

Memory 502 can include random access memory and/or non-volatile memory. For example, memory 502 can include one or more magnetic disk storage devices, one or more optical storage devices, and/or flash memory. Memory 502 can store various instructions for performing some or all aspects of the physical location recommendation of this disclosure.

Various functions of system 500 may be implemented in hardware and/or in software, including in one or more signal processing and/or application specific integrated circuits. The features described in this disclosure can be implemented in digital electronic circuitry, or in computer hardware, firmware, software, or in combinations of them. The features can be implemented in a computer program product tangibly embodied in an information medium, e.g., in a computer-readable storage medium, for execution by a processor; method steps can be performed by a processor executing a program of instructions to perform functions of the described examples.

The described features can be implemented in one or more computer programs that are executable on a programmable system including at least one processor coupled to receive data and instructions from, and to transmit data and instructions to, a data storage system, at least one input device, and at least one output device. Suitable processors for the execution of a program of instructions include, by way of example, both general and special purpose microprocessors, and the sole processor or one of multiple processors or cores, of any kind of computer. Generally, a processor can receive instructions and data from a read-only memory or a random access memory or both. Generally, a computer can also include, or be operatively coupled to communicate with, one or more storage devices for storing data files; such devices can include magnetic disks, such as internal hard disks and removable disks, magneto-optical disks, and optical disks. Storage devices suitable for tangibly embodying computer program instructions and data can include all forms of non-volatile memory, magnetic disks such as internal hard disks and removable disks, magneto-optical disks, and CD-ROM and DVD-ROM disks. The processor and the memory can be supplemented by, or incorporated in, ASICs (application specific integrated circuits).

Figure 6:
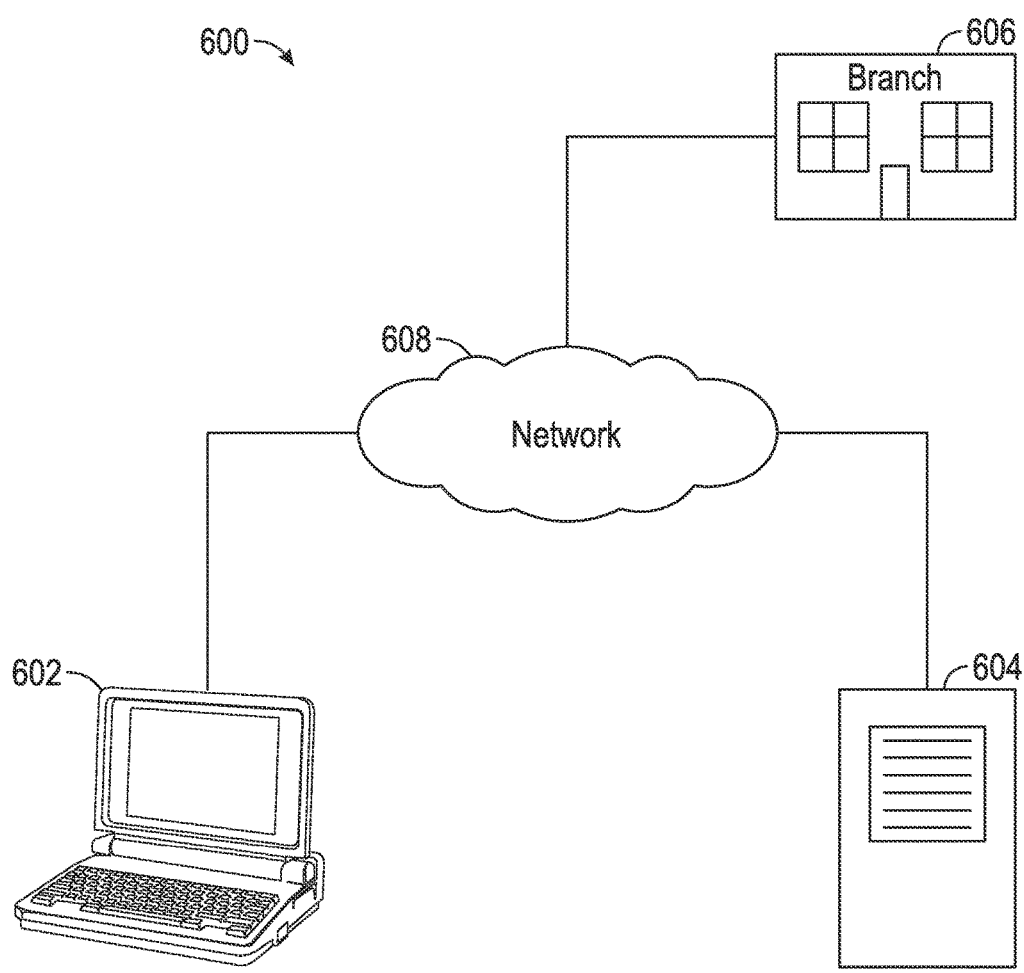
FIG. 6 is a block diagram of an exemplary network system for implementing the physical location recommendation of the disclosure.

FIG. 6 is a block diagram 600 of an exemplary network system for implementing the physical location recommendation of the disclosure. Network system 600 can incorporate one or more of the features of the examples disclosed above, some of which will not be repeated here for brevity. User device 602 can be any device at which a user can initiate an electronic activity as described in the disclosure. For example, user device 602 can be a computing device such as a laptop computer, a telephone, a tablet computer, an ATM, or any device at which the user can initiate the electronic activity.

Server 604 can be any device that can implement the physical location recommendation of the disclosure. For example, server 604 can be a server-grade computing device that can recommend a physical location to the user at which the user can complete the electronic activity that the user initiated on user device 602. Server's 604 recommendation can be based on one or more of the features described previously in the disclosure.

Physical location 606 can be the physical location at which server 604 recommends the user complete the electronic activity. For example, physical location 606 can be a bank branch or an ATM.

User device 602, server 604 and physical location 606 can communicate with each other via network 608. Network 608 can be a wireless network, a cellular network, a wired network, the internet, and/or any network suitable for communication between user device 602, server 604 and physical location 606.

In exemplary operation, user device 602 can communicate with server 604 via network 608 when the server recommends a physical location to the user device, for example. If the user accepts the recommended physical location, user device 602 and/or server 604 can communicate with physical location 606 via network 608 regarding the electronic activity so that the physical location can prepare for the user to complete the electronic activity at the physical location, for example. As such, various devices and locations can communicate as described to implement the physical location recommendation of the disclosure.

As described above, the examples of the disclosure provide one or more ways in which a computing system can provide a recommended physical location to a user at which the user can complete an activity that was initiated at another location. Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

We claim:

1. A method, comprising:
   detecting initiation of an electronic activity by a user at a first physical location;
   determining that the electronic activity is to be completed at a second physical location different from the first physical location;
   determining one or more portions of the electronic activity that remain incomplete;
   based on at least one characteristic of the one or more incomplete portions of the electronic activity, identifying a second physical location at which to complete the one or more incomplete portions of the electronic activity, the identifying comprising:
      determining that a past location of the user is closer to the second physical location than to a third physical location, the third physical location being different from the first and second physical locations; and
      when the past location of the user is closer to the second physical location than to the third physical location, selecting the second physical location at which to complete the electronic activity; and
   providing information about the electronic activity to the second physical location.

2. The method of claim 1, wherein determining that the electronic activity is to be completed at the second physical location different from the first physical location comprises determining that the electronic activity requires completion at the second physical location different from the first physical location.

3. The method of claim 1, wherein determining that the electronic activity is to be completed at the second physical location different from the first physical location comprises detecting a request by the user to complete the electronic activity at the second physical location different from the first physical location.

4. The method of claim 1, wherein identifying the second physical location comprises determining that one or more past locations of the user are disposed proximate to to the second physical location.

5. The method of claim 1, wherein
the second physical location is a first distance from the first physical location, and a third physical location is a second distance from the first physical location, the first distance being greater than the second distance.

6. The method of claim 1, wherein:
the second physical location is a first distance from a first past location of the user, and a third physical location is a second distance from a second past location of the user, the first distance being greater than the second distance, and
identifying the second physical location comprises:
determining that the user's average duration at the first past location is longer than the user's average duration at the second past location; and
based on the determination that the user's average duration at the first past location is longer than the user's average duration at the second past location, selecting the second physical location at which to complete the electronic activity.

7. The method of claim 1, wherein identifying the second physical location comprises:
determining one or more resources needed to complete the one or more incomplete portions of the electronic activity; and
determining that the second physical location has the one or more resources.

8. The method of claim 1, wherein identifying the second physical location comprises determining that a wait time at the second physical location is shorter than a threshold amount of time.

9. The method of claim 1, wherein the electronic activity comprises an activity initiated online at the first physical location.

10. The method of claim 1, wherein providing the information about the electronic activity to the second physical location comprises providing a current state of the electronic activity to the second physical location.

11. The method of claim 1, further comprising scheduling an appointment with a resource at the second physical location for completing the electronic activity at the second physical location.

12. The method of claim 1, further comprising providing information about the user to the second physical location for use in completing the electronic activity.

13. The method of claim 1, further comprising providing the user with information about one or more actions for the user to take at the second physical location to complete the one or more incomplete portions of the electronic activity.

14. The method of claim 1, wherein:
the electronic activity comprises a transaction between the user and a first party, and the second physical location is not formally associated with the first party.

15. The method of claim 1, wherein determining that the electronic activity is to be completed at the second physical location different from the first physical location comprises:
determining that one or more portions of the electronic activity are to be completed at the second physical location based on regulations associated with the electronic activity.

16. The method of claim 1, wherein determining that the electronic activity is to be completed at the second physical location different from the first physical location comprises:
in accordance with a determination that the user has a first characteristic, determining that a first portion of the electronic activity is to be completed at the second physical location; and
in accordance with a determination that the user has a second characteristic, different from the first characteristic, determining that a second portion of the electronic activity, different from the first portion, is to be completed at the second physical location.

17. The method of claim 1, wherein determining that the electronic activity is to be completed at the second physical location different from the first physical location comprises:
in accordance with a determination that the user has a first characteristic, determining that a first portion of the electronic activity is to be completed at the second physical location; and
in accordance with a determination that the user has a second characteristic, different from the first characteristic, forgoing determining that the first portion of the electronic activity is to be completed at the second physical location.

18. The method of claim 1, wherein determining that the electronic activity is to be completed at the second physical location different from the first physical location comprises:
determining whether the user may be likely to purchase a product or service distinct from the electronic activity;
in accordance with a determination that the user may be likely to purchase the product or service, determining that the electronic activity is to be completed at the second physical location; and
in accordance with a determination that the user may not be likely to purchase the product or service, forgoing determining that the electronic activity is to be completed at the second physical location.

19. A non-transitory computer-readable storage medium having stored therein instructions, which when executed by a processor, cause the processor to perform a method comprising:
detecting initiation of an electronic activity by a user at a first physical location;
determining that the electronic activity is to be completed at a second physical location different from the first physical location;
determining one or more portions of the electronic activity that remain incomplete;
based on at least one characteristic of the one or more incomplete portions of the electronic activity, identifying a second physical location at which to complete the one or more incomplete portions of the electronic activity, the identifying comprising:
determining that a past location of the user is closer to the second physical location than to a third physical location, the third physical location being different from the first and second physical locations; and
when the past location of the user is closer to the second physical location than to the third physical location, selecting the second physical location at which to complete the electronic activity; and
providing information about the electronic activity to the second physical location.

20. A system, comprising:
a memory configured to store instructions; and
a processor coupled to the memory and configured to execute the stored instructions to perform a method comprising:
   detecting initiation of an electronic activity by a user at a first physical location;
   determining that the electronic activity is to be completed at a second physical location different from the first physical location;
   determining one or more portions of the electronic activity that remain incomplete;
   based on at least one characteristic of the one or more incomplete portions of the electronic activity, identifying a second physical location at which to complete the one or more incomplete portions of the electronic activity, the identifying comprising:
      determining that a past location of the user is closer to the second physical location than to a third physical location, the third physical location being different from the first and second physical locations; and
      when the past location of the user is closer to the second physical location than to the third physical location, selecting the second physical location at which to complete the electronic activity; and
   providing information about the electronic activity to the second physical location.

* * * * *